Sept. 6, 1938. B. A. SWENNES 2,129,366
FLUID CLUTCH AUTOMATIC TRANSMISSION
Filed June 8, 1936 5 Sheets-Sheet 3

Inventor:
Benjamin A. Swennes
By Edward C. Fitzhugh
Atty.

Sept. 6, 1938. B. A. SWENNES 2,129,366
FLUID CLUTCH AUTOMATIC TRANSMISSION
Filed June 8, 1936 5 Sheets-Sheet 5

Patented Sept. 6, 1938

2,129,366

UNITED STATES PATENT OFFICE 2,129,366

FLUID CLUTCH AUTOMATIC TRANSMISSION

Benjamin A. Swennes, Rockford, Ill., assignor to Borg-Warner Corporation, a corporation of Illinois Application June 8, 1936, Serial No. 84,078

9 Claims. (Cl. 74—189.5)

This invention has to do with change-speed power transmission mechanism for motor vehicles, and relates particularly to a mechanism automatically adjustable for speed transmission at different ratios in accordance with changes in speed and torque.

An object of the present invention is the provision in an automatic transmission having a plurality of power trains of relatively low and high speed ratio adapted to come successively into operation, of means for delaying the action of the power train of higher speed ratio.

Another object of the present invention is the provision of an automatic change-speed power transmission of a type wherein a change of speed ratio is dependent upon the position of an impositive clutch-driven-member shiftable between positions of relative efficient and inefficient power transmission with respect to the driving member of such clutch.

A further object of the present invention is the provision of transmission mechanism as the above wherein the change of speed ratio is in accordance with the degree of torque, speed, or a combination of torque and speed.

These and other desirable objects of the invention are obtained through the novel arrangement, the unique construction and the improved combination of the various parts hereinafter described in conjunction with the accompanying five sheets of drawings hereby made a part of the specification, and in which.

Similar parts are designated by the same characters of reference in the various figures of the drawing and throughout the description that follows.

Figure 1:
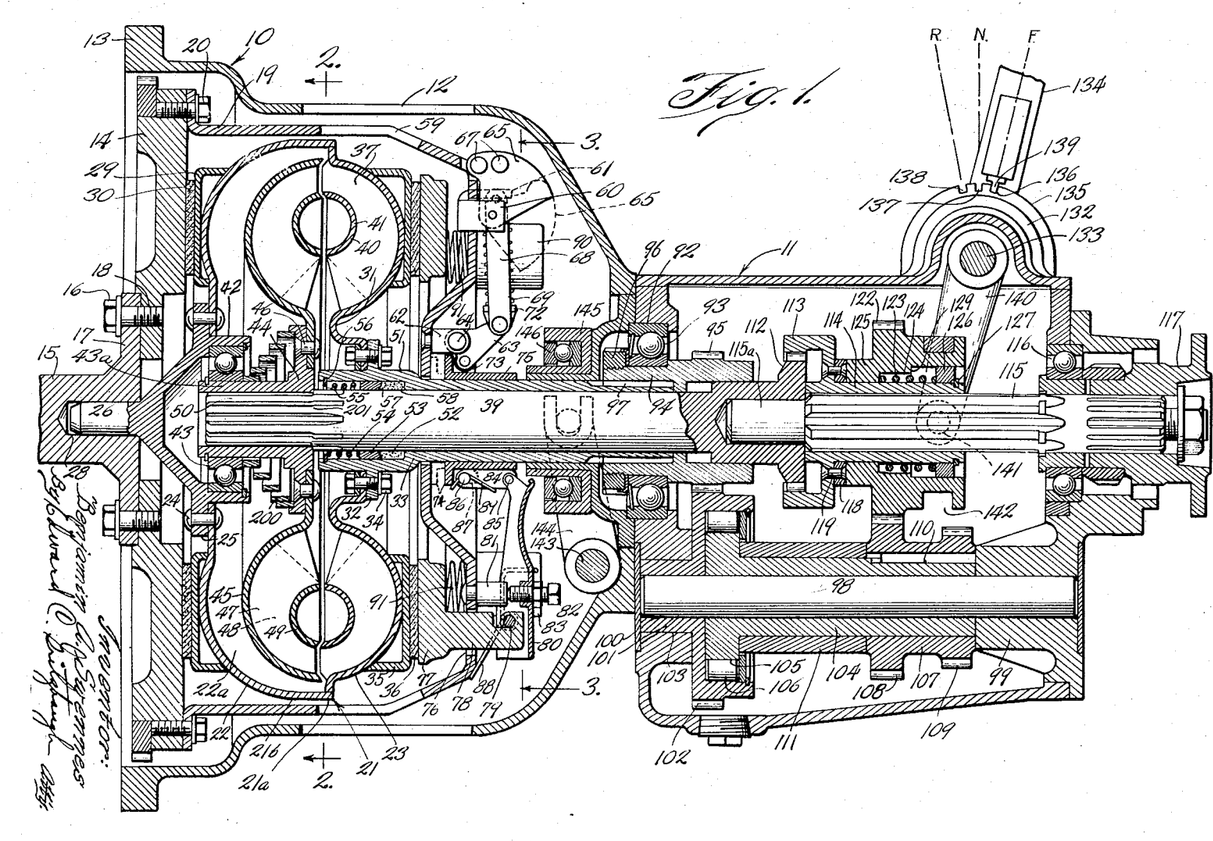
Fig. 1 is a longitudinal sectional view taken axially through a transmission embodying a form of the present invention.

The device as illustrated in Fig. 1 is enclosed in a bell housing 10 and a gear case 11. The bell housing 10 and the gear case 11 may be of cast metal. They are adapted to be secured together by bolts, not shown. The bell housing 10 has a plurality of radially placed openings 12 which provide for air circulation and a means of access to mechanism enclosed therein. A flange 13 about the front or left end of the housing 10 may be secured in any standard manner to the back end of the motor of the vehicle upon which the transmission is installed.

Within the front section of the bell housing 10 is a motor fly wheel 14 which is secured to the crank shaft 15 of the motor by means of bolts 16. The bolts 16 extend through suitable apertures in a flange 17 which may be integral with the shaft 15, and are threaded into apertures 18 aligned therewith in the fly wheel. The periphery of the fly wheel 14 has attached thereto by means of a series of bolts 20 a bell-shaped clutch carrier member 19.

A fluid clutch indicated generally by the indicia 21 is enclosed by the bell-shaped carrier 19. The impeller member 21a of the fluid clutch 21 has a hollow and somewhat toroidal section 21b formed of two complemental parts 22 and 23 which are welded or otherwise suitably connected to one another at their peripheral edges. The member 22 of the fluid clutch impeller is of slightly greater dimensions than the member 23, and is particularly of greater axial extent to effect a pocket 22a. Said member 22 is connected by a plurality of rivets 24 to the flange 25 of a stub shaft 26 piloted in a bearing 28 within an end of the crank shaft 15. An annular shoe 29 of sheet metal is secured to the front section of the clutch impeller 21a and has attached thereto a friction element 30 for coacting with the back face of the fly wheel 14 during certain stages of operation of the device hereinafter to be described. Part 23 of the fluid clutch impeller 21a has a hub section 31 coupled to a flange 32 projecting radially from a sleeve 33. Bolts 34 are employed for effecting such coupling. Upon the back of the impeller part 23 is an annular friction clutch shoe 35 having thereon a friction element 36.

Figure 2:
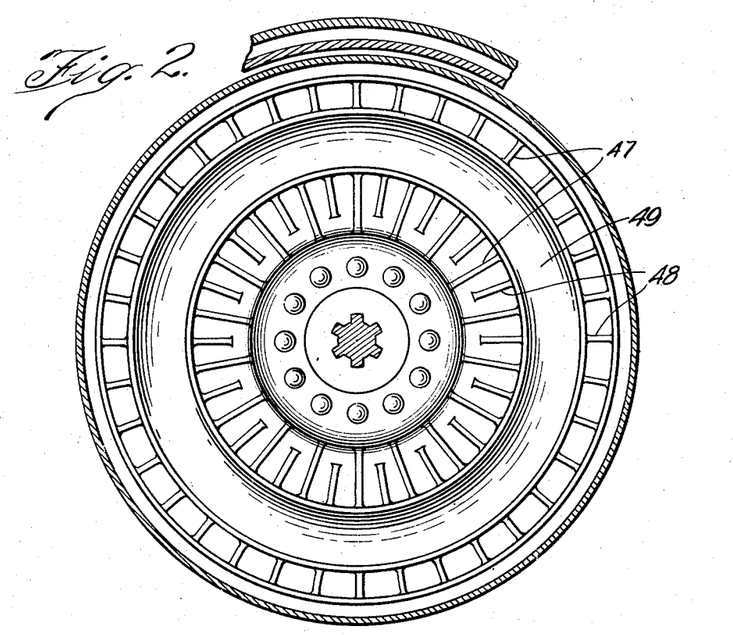
Fig. 2 is a sectional view taken on the line 2—2 of Fig. 1 and showing construction details of the interior of a fluid or flowable substance medium clutch.

Upon the inner side of the toroidal section of the impeller part 23 is a series of vanes 37 in alternate relation with a series of vanes 38, the vanes of each series being in radial relation with respect to the fluid clutch rotational axis; see Figs. 1 and 2. Each of the vanes 37 and 38 has a notched section 40. Within such notched sections is carried a fluid guide ring 41 of semi-circular cross section.

Within the recess provided by a circular flange 42 extending backwardly from the flange 25 of the stub shaft 26 is a ball bearing 43 in which there is journalled the sleeve portion 43a of a hub 44 for a runner 45 enclosed within the fluid clutch impeller 21a. The runner 45 may be secured to the hub 44 by means of rivets 46. Projecting from the inner or back side of the runner 45 is a series of vanes 47 and 48 arranged similarly to the vanes 37 and 38 and carrying a fluid guide ring 49 in opposed complemental relation with the ring 41. The front end of the shaft 39 is splined at 50 to facilitate a driving connection between the runner hub 44 and said shaft. Normally the conical spring 200, which bears against the bearing 43, holds the runner 45 in close relation with the impeller as shown in Fig. 1. A shoulder 201 on the shaft 39 adapts the shaft to force the runner 45 to the left away from the member 23 and into the pocket 22a upon axial movement of said shaft in a manner later described. When subsequently the shifting force is removed from the shaft 39, the spring 200 is adapted to retract said shaft and the runner 45 to the position shown in Fig. 1.

The fluid clutch is made operative by placing a flowable substance such as oil or a comminuted material in the impeller 21a. A plugged opening, not shown, is provided for this purpose in the impeller wall. Thereafter when the impeller is rotated, the flowable substance serves as a power transmitting medium between the vanes of the impeller and the runner to cause the latter to tend to follow the movement of the former. The efficiency of the flowable substance medium clutch depends both upon its speed of rotation and the proximity of the runner 45 to the member 23 carrying the impeller vanes 37 and 38. When the runner 45 is shifted forwardly into the pocket 22a, the clutch will transmit but negligible power though said clutch may be rotating at relatively high speed. The clutch is of such size and design that when the runner 45 and member 23 are in close proximity as shown, and when the vehicle upon which it is installed is moving at a rate of speed and under conditions of resistance at which a one to one ratio driving connection is desirable between the vehicle engine and the propeller shaft thereof, the clutch will operate at an efficiency permitting of not more than 1 or 2 per cent. slip of the runner and impeller 21a.

The shaft 39 is freely rotatable relatively to the sleeve 33. A fluid seal is provided between the shaft 39 and the sleeve 33 within the forward end of the latter which is enlarged as indicated at 51. A body of suitable packing material 52 is stuffed into the enlarged end 51 of the sleeve 33, where it is compressed by a collar 53 which is urged to the right by a compression spring 54. Spring 54 is seated against an abutment member 55 which may be expansible and snapped into place within a groove 56 formed interiorly of the enlarged end 51 of the sleeve.

It will be seen in Fig. 1 that the opposed inclined surfaces 57 and 58 upon the collar plunger 53 and the sleeve respectively will cause a compression of the packing material 52 against the shaft 39, thereby increasing the efficiency of the seal.

Automatic means now to be described is employed for connecting the crank shaft 15 with the transmission device. As hereinabove explained, the friction clutch carrier 19 is bolted to the fly wheel 14 for rotation therewith. The carrier 19 has a number of openings 59 which provide a means of access to the fluid or flowable-substance medium clutch, and which further provide ventilation for cooling the device. Disposed angularly about the back side of the carrier 19 are three pairs of lugs 60. Between each pair of lugs 60 is a lug 61, and radially inwardly of each lug 61 there is anchored upon the carrier 19 a U-shaped bracket 62; see Fig. 3. Levers 63 are secured between the legs of the brackets 62 by means of pivot pins 64. Centrifugal weights 65 are pivoted at 66 to the lugs 60, the weights upon each pair of lugs 60 being joined by pins or bolts 67 which in addition to adding to the centrifugal mass of the weights provide for their coordination of action and rigidity of construction. Paired links 68 form a connection between an end of each lever 63 and the weights 65 in radial alignment therewith. The links 68 are pivotally connected with the levers 63 and with their respective weights, the connection with the weights being at a point selectively spaced from their point of pivotal anchorage. A compression spring 69 is placed between each lug 61 and the end of the lever 63 opposed thereto, and to which the links 68 are attached. Telescopically connected guide pins 70 and 71, connected respectively to the lugs 61 and coupling members 72 between the levers 63 and the links 68, serve as retaining means for the springs 69 for maintaining them in position.

Figure 3:
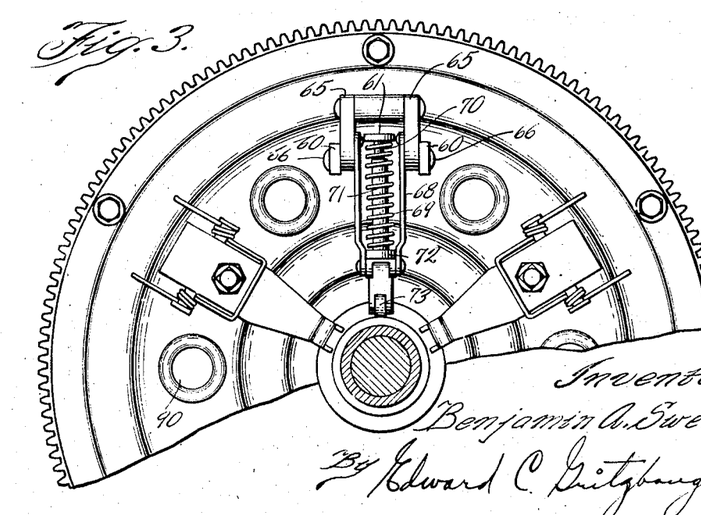
Fig. 3 is a transverse sectional view of the device taken on the line 3—3 of Fig. 1 and illustrates devices for the automatic operation of a friction clutch.

Upon the ends of levers 63 opposite to that to which the links 68 are coupled are journalled rollers 73. The rollers 73 are arranged for exerting pressure against a flange 74 turned radially outwardly from a sleeve 75, which is slidable axially of the sleeve 33. At this time it should be noted that the levers 63 are designed to multiply the force of the springs 69 as applied to the sleeve flange 74.

Arranged alternately with the centrifugal mechanisms just described on the back of the bell-shaped carrier 19 are three openings 76. The carrier contains a pressure plate 77 for coaction with friction element 36. Three bosses 78 which may be integral with the pressure plate 77 extend backwardly therefrom through the openings 76. Pivotally connected with each of the bosses 78 by means of pins 79 are levers 80. The levers 80 may be formed of pressed steel. Adjacent to each openings 76 and radially inwardly therefrom upon the back of the carrier 19 are fulcrum blocks 81. Adjustable fulcrum members 82 are threaded within the backs of each of the levers 80 and abut against the fulcrum blocks 81 which are aligned therewith. Locking nuts 83 may be used for maintaining a selected adjustment of the fulcrum members 82. The inner ends of levers 80 are connected to the slidable sleeve 75 by means of links 84, the links 84 being secured to their respective levers 80 by means of pins 85 and the sleeve 75 by means of pins 86 anchored in ears 87 projecting radially from the sleeve 75. Spring devices 88 and 89 mounted respectively upon pins 79 and 86 bear against levers 80 and links 84 to prevent rattling of such levers and links during operation of the transmission.

Six spring cups or seats 90 are arranged about the back side of the back of carrier 19 in alternate relation with the centrifugal devices and the levers 80. Strong compression springs 91 have an end confined within the cups 90 and an opposite end bearing against the back side of the pressure plate 77. Thus it will be seen that the springs 91 at all times urge the pressure ring 77 forward to a position in engagement with the friction element 36. It will be noticed that the springs 69 are appreciably lighter and possessive of less force than the springs 91, but are effective to overcome the force of the springs 91 because of the mechanical advantage gained through the levers 63 and 80. When, however, the fly-wheel 14 is rotated at a speed greater than idling speed of the vehicle motor, the weights 65 are thrown outwardly whereby to move the links 68 radially outward to compress the springs 69, which normally oppose and overbalance the force of the springs 91. Outward movement of the links 68 concurrently with the compression of the springs 69 and counterclockwise pivotal movement of the levers 63 permits the springs 91 to force the pressure plate 77 to the left meanwhile pivoting the levers 80 in a clockwise direction, and shifting the sleeve 75 to the right. The force exerted by the pressure plate 77 against the friction element 36 moves the clutch 21 slightly to the left, Fig. 1, to concurrently effect an engagement between the friction element 30 and the fly-wheel 14. At this time there will be effected a driving connection between the vehicle motor and the impeller element of the clutch 21; and through the intervention of parts now to be described, a low speed driving train will be completed through the transmission device.

The opening 92 in the front wall of the gear box 11 has secured therein a ball bearing 93. Journalled within the ball bearing is a sleeve 94 formed integrally with a gear 95. Relative axial movement between the gear 95 and the bearing 93 is precluded by a nut 96 threaded upon an end section of the sleeve 94 into abutting relation with an element of the bearing 93. The sleeve 94 is non-rotatively connected to the sleeve 33 by a splined connection 97. The connection 97, however, allows a slight relative axial displacement between the sleeves 33 and 94 and hence permits of the axial movement of the clutch impeller 21a as set out hereinabove in conjunction with the description of the manner in which the pressure plate 77 causes engagement of the friction element 30 with the fly-wheel 14.

A countershaft 98 is journalled in bearings 99 and 100, the bearings being respectively within an end wall of the gear case 11 and the hub 101 of a gear 102. The gear hub 101 is journalled at 103 in the gear case. Gears 95 and 102 are in constant mesh with one another. A sleeve 104 journalled upon the countershaft 98 has an overrunning connection at 105 with the gear 102 by means of the rollers 106. Any standard construction may be used for the overrunning clutch connection between the gear 102 and the sleeve 104.

A gear cluster 107 comprising gears 108 and 109 is keyed at 110 to the right end of the sleeve 104. The proper spacing between the gear cluster element 107 and the gear 102 is maintained by means of a collar 111 and the inner end of the bearing 99.

A jaw clutch element 112 for co-engagement with a jaw clutch element 113 is formed integrally with the right end of the shaft 39. The jaw clutch 113 forms a part of a sleeve 114 which is splined upon a driven shaft 115. One end of the driven shaft 115 is journalled in a bearing 116 within the right end of the gear case 11. The opposite end of the shaft 115 has an end section 115a of reduced diameter journalled within the recessed end of the shaft 39. Secured to the back end of the shaft 115 is a coupling member 117 for facilitation of a connection between the driven shaft 115 and the propeller shaft, not shown, of a vehicle upon which the transmission may be installed.

A circular cam member 118 is slid upon the sleeve 114 and anchored thereto in any suitable manner as by means of pins or rivets 119. A series of cam projections 120 having inclined camming surfaces 121 project backwardly from the cam member 118 in spaced relation to one another; see Figs. 4 and 5. A gear 122 is placed upon the sleeve 114 in a manner permitting of relative rotation and relative axial movement between the sleeve and the gear. Subsequent to the placing of the gear 122 upon the sleeve 114 a compression spring 123 is inserted into a recessed section 124 of the gear in abutting relation with the bearing section 125 thereof. An abutment ring 126 is placed behind the spring 123 and there held in position by a key 127 which may be in the form of a split ring adapted to snap into a groove 128 encircling the right end of the sleeve 114. An internal shoulder 129 coacts with the stop 126 to limit axial movement between the gear 122 and the sleeve 114 in one direction, while axial movement between the gear and sleeve in the opposite direction is limited by the cam 118. Cam projections 130 having inclined cam surfaces 131 for coacting with the cam surfaces 121 extend forwardly from the gear 122.

Journalled within a bearing 132 upon the top of the gear box 11 is a shaft 133 carrying a hand operated gear shifting lever 134. A semi-circular piece 135 is arranged coaxially with the shaft 133 and contains three notches 136, 137 and 138 for engagement with a manually operated latch 139 carried upon the gear shifting lever 134. Also carried upon the shaft 133, interiorly of the gear box 11, is a yoke 140 the legs of which carry pins 141 diametrically opposed with respect to the axis of the sleeve 114 and extending into a groove 142 therein.

Figures 4, 5, 6:
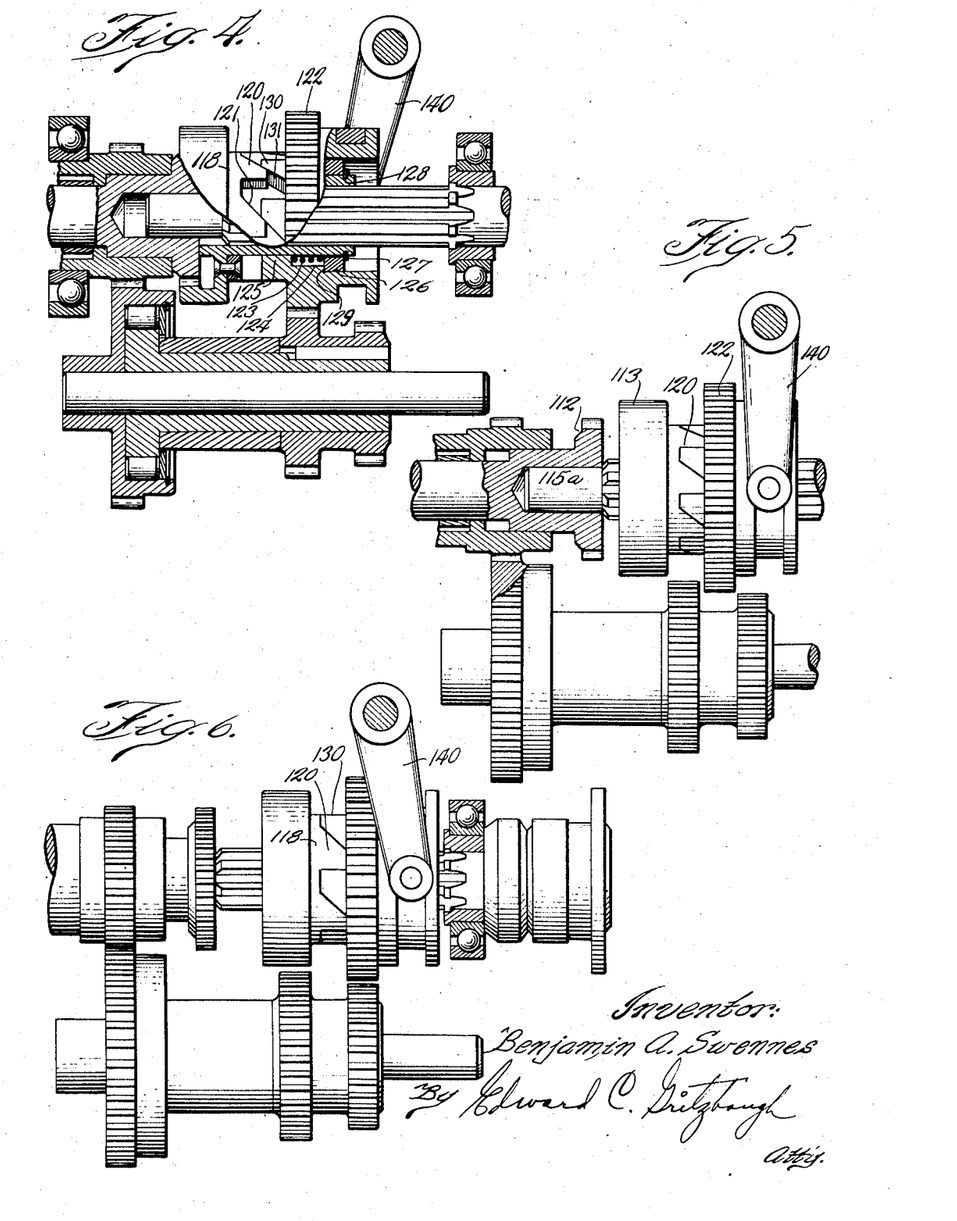
Fig. 4 is a fragmentary side elevation of the transmission gearing, there being parts broken away to illustrate a camming device operable to maintain one of the power trains of the transmission out of efficient driving relation during a certain stage of operation of the transmission.
Figs. 5 and 6 are fragmentary views illustrating the interrelation of parts of the gears while they are arranged, respectively, in neutral and for reverse drive.

The gear shifting lever 134 is shiftable into positions R, N or F indicating reverse, neutral and forward positions, respectively, for the gear 122. Figs. 1 and 4 show the gear 122 in the position it occupies when the transmission is set for driving the vehicle forward. In Fig. 5 the gear 122 is shown in the neutral position, and in Fig. 6 the gear 122 is shown in the position occupied when the transmission is arranged for transmitting reverse drive to the vehicle. When in the reverse drive position, the gear 122 is driven by the gear 109 through the intervention of an idler gear, not shown, in accordance with standard practice.

The operation of the device will now be described:

First, it will be assumed that the gear 122 is in the forward drive position corresponding to position F of the gear shifting lever 134. Axial movement of the gear 122 is precluded by the engagement of the latch 139 with the notch 136. Gears 122 and 108 will be meshed as shown in Fig. 1.

Sleeve 114 will be urged backwardly by the spring 123 and the shaft 39, and the clutch driven member 45 will be urged backwardly by the spring 200. That is, the spring 200 will always maintain an engagement between the back end of shaft 39 and the front end of sleeve 114 as long as the lever 134 is set for forward drive. The inertia weight members 65 will be in the inward radial position shown in dotted outline in Fig. 1 and thereby permitting the springs 69 to exert their full force in opposition to the springs 91 which tend to effect an engagement between the pressure ring 77 and the friction element 36, and between the flywheel 14 and the friction element 30. The vehicle motor may be started in the conventional manner. So long as the motor is not driven above idling speed, the weights 65 will remain substantially within their inner position, and the clutching connection between the flywheel, the parts carried thereby and the impeller member of the clutch 21 will be constrained.

Incident to an acceleration of the motor, the weights 65 will move radially outwardly to cause a clutching engagement between the fly-wheel 14 and the impeller member of the clutch 21 in the manner hereinabove described. There will then be completed a power train of fixed speed transmission between the crank shaft 15 and a vehicle torque tube, not shown, connected to the coupling member 117. Power, at a reduced speed transmission, is delivered successively through the various elements of such power train in the following order:

Crank shaft 15, fly-wheel 14, carrier 19, pressure plate 77, friction elements 30 and 36, the clutch impeller 21a, sleeve 33, gear 95, gear 102, clutch rollers 106, sleeve 104, gears 108 and 122, cam projections 130, cam 118, sleeve 114, and driven shaft 115. Because of the resistance of the vehicle load, there will be a development of torque between the cam projections 130 of the gear 122 and the cam projections 120 of the cam member 118. As a consequence of the torque thus developed, the bevelled camming surfaces 131 and 121 coact to move the sleeve 114 to the left, Fig. 1, coincidental to compressing the spring 123. Sleeve 114 presses shaft 39 to the left or forwardly thereby shifting the clutch driven member 45 out of operative relation with the clutch impeller. The gear 122 and the cam member 118 will, as an incident to such movement, be separated from the position shown in Fig. 1 to the position shown in Fig. 4. Further separation of the gear 122 and the cam member 118 is prevented by the abutment of ring 126 with the shoulder 129. The projecting cam parts 120 and 130 are thus left in a meshed position so that driving force may be imparted from the latter to the former.

At the time the drive is established through the power train of reduced speed transmission, the operation of which has just been described, only an inconsequential amount of torque will be transmitted through the power train of higher speed ratio comprising the serial arrangement of the driving and driven parts of the flowable substance medium clutch 21 and the jaw clutch members 112 and 113. If the clutch driven member 45 were close to the impeller 21a as shown in Fig. 1, then upon an increase in speed of the impeller, the clutch's efficiency would greatly increase so that the driven member would rotate at practically the same speed as the impeller, even though the runner were subjected to a load such as that required to drive the vehicle; and, thereupon, an efficient direct drive of the vehicle would be obtained.

It will be conceived that if the clutch 21 were to establish the one to one ratio of drive therethrough prior to the vehicle engine obtaining a speed at which its operating efficiency is adequate to rapidly accelerate the vehicle in such ratio, the vehicle would have an interval of low acceleration immediately upon the transfer into the higher ratio. Furthermore, an increasing amount of torque would be transmitted through the direct drive power train while torque is still being delivered through the train of lower speed ratio, and hence the available power for acceleration through the train of lower speed ratio would be diverted, thus diminishing the otherwise possible rate of acceleration in the lower speed ratio. The clutch 21 is designed so that it is capable of providing for vehicle drive therethrough at relatively low engine speeds in order to avoid premature shifts into the lower speed ratio once the higher speed ratio has been attained. When rapid acceleration is desired, some means must be provided for maintaining the clutch 21 substantially inoperative so that the increase in speed may be gained by directing all available power through the low speed gear train. This means is embodied in the camming devices between the gear 122 and jaw clutch member 113, whereby the clutch driven member 45 is shifted forwardly into an inefficient operating position while a substantial amount of torque is transmitted through the gear train. Upon a momentary closing of the engine throttle, pressure between the camming surfaces 121 and 131 will be relieved; spring 123 will then retract sleeve 114; and spring 200 will come into play to shift the clutch driven member 45 into efficient driving relation with the impeller 21a. Thereafter, under ordinary cruising speeds and load the clutch 21 will permit of so little slip between the driving and driven parts thereof as to maintain the higher speed ratio connection while the sleeve 104 overruns the gear 102.

The device will remain in the direct drive connection until there is such a reduction in the speed of the fluid clutch and/or delivery of torque thereby as will cause between the driving and driven elements thereof a slippage resulting in a speed transmission ratio less than that of the reduction gear power train. At that time the drive will be automatically established through the power train of fixed ratio. The drive through the direct power train may again be established either by an increase in vehicular speed and a subsequent reduction of torque in the manner hereinabove described, or by a simple reduction in torque.

Manually operated means for independent actuation of the friction clutch pressure plate 77 will now be described. Extending transversely of the bell housing 10 is a shaft 143 upon which there is non-rotatively placed a yoke 144 of which the opposed legs are connected operatively with a collar 145 shiftable longitudinally of the sleeve 33. The collar 145 carries within a circular channel section thereof a roller bearing device 146. Means, not shown, within the driving compartment of the vehicle may be employed for rotating the shaft 143, thereby causing movement of the bearing member 146 to the left, Fig. 1, against the inwardly projecting ends of levers 80. Such movement of the bearing member 146 is adapted to cause counter-clockwise rotation of the levers 80 and consequential displacement of the pressure plate 77 from the friction element 36.

Because of the connecting links 84 between the levers 80 and the sleeve 75, the sleeve will be moved from the position shown in full outline in Fig. 1 to the position shown in dotted outline. Operation of the manual means thus described for operation of the friction clutch pressure plate 77 may become necessary only in instances of emergency while the fly-wheel 14 is rotating at a sufficient speed to effect automatic engagement of the friction clutch. It will be noted that the manual operation for releasing the clutch is in no way impeded by the tendency of the automatic mechanism to permit of clutch engagement. The manually operated parts for releasing the clutch are simply substituted for the automatic mechanism and operate independently thereof when releasing the clutch.

The automatic transmission is arranged in a neutral position when the gear shifting lever 134 is moved into the position N with an engagement between the latch member 139 and the notch 137. At such time, the gear 122 will be in a position half way between the gears 108 and 109 so that it is impossible for power to be delivered to the gear 122 through the power train of low speed transmission. Simultaneously with the movement of the gear 122 into the neutral position, the jaw clutch member 113 is moved to the right of jaw clutch member 112 as illustrated in Fig. 5. The power train for direct drive is thus broken with the disengagement of clutch members 112 and 113.

Reverse drive through the transmission mechanism is accomplished by shifting the lever 134 into the position R, where it is maintained by the engagement between the latch 139 and the notch 138. At this time the gear 122 and the idler gear, not shown, and in constant mesh with the gear 109, will be engaged. While the transmission is transmitting power for reverse drive the squared or back driving surfaces of the cam projections 120 and 130 will be pressed together and there will be no tendency for the cam 118 to be displaced from the gear 122.

Figure 7:
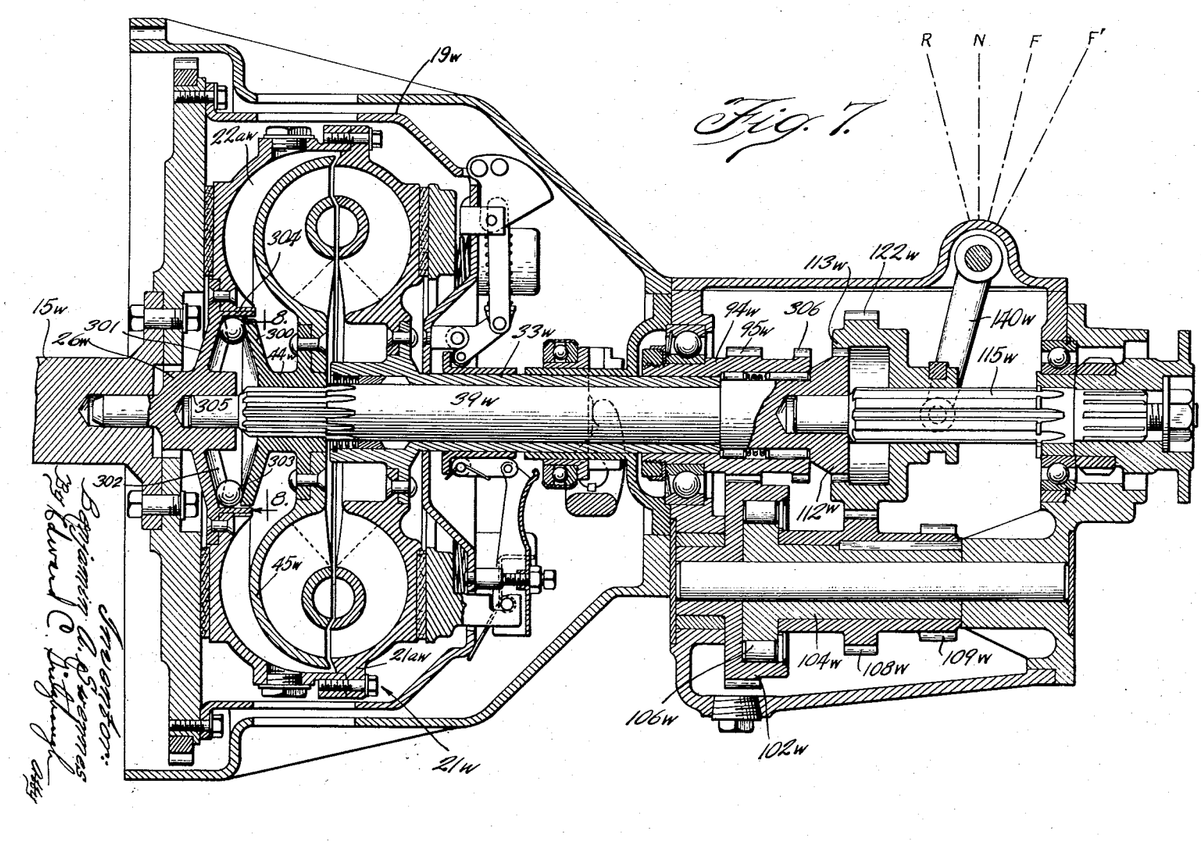
Fig. 7 is a view similar to that of Fig. 1, but of a modified embodiment of the invention.
Figures 8, 9:
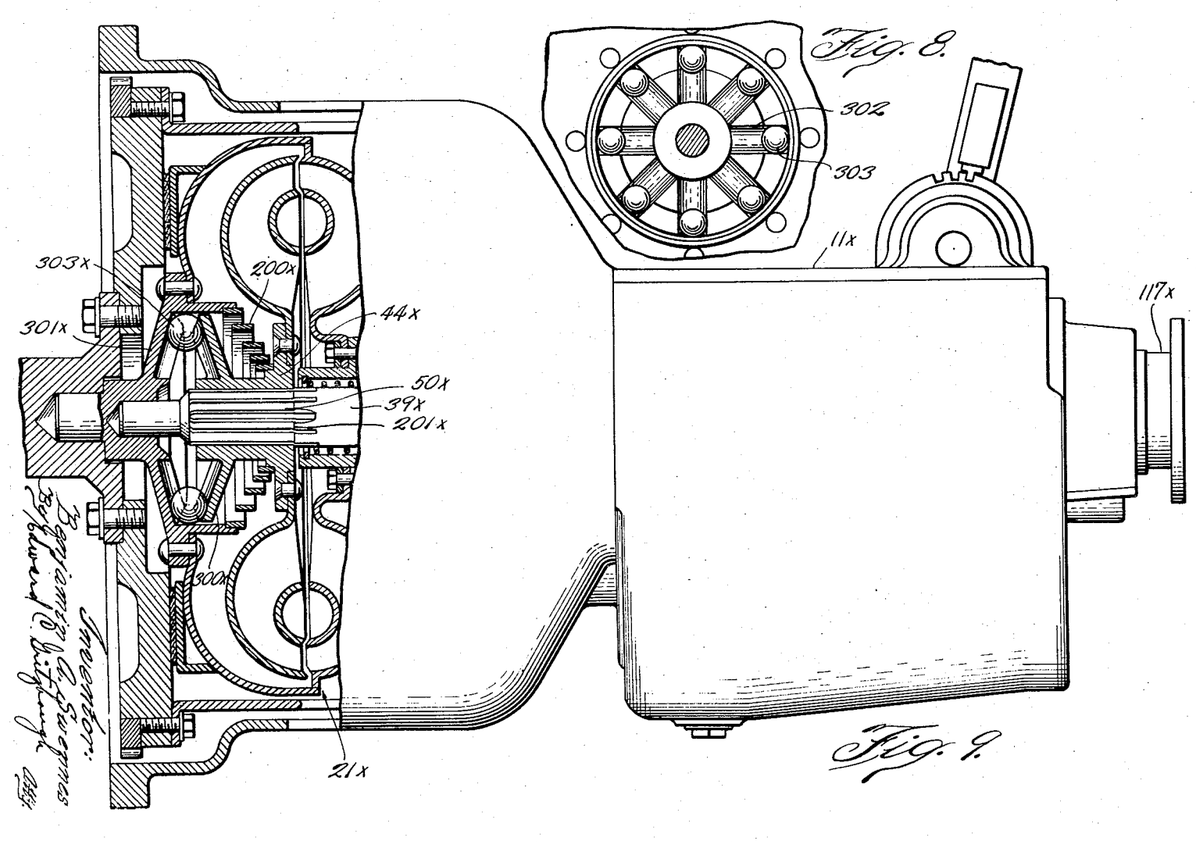
Fig. 8 is a fragmentary view taken on the line 8—8 of Fig. 7.
Fig. 9 is a side elevation of a third embodiment of the invention, parts being broken away and parts being shown in section for clarity of illustration.

A second form of the invention is illustrated in Figs. 7 and 8. Those parts of the apparatus shown in Fig. 7 and corresponding to parts shown in Figs. 1 to 6 inclusive are indicated by the same reference character with a "w" added. The principal difference between that form of the invention shown in Figs. 7 and 8, and that in Fig. 1 is in the substitution for the spring 200 urging the clutch driven element into its efficient driving position, of a centrifugal device, which urges said driven member into such efficient position only when the transmission device has gained substantial rotative speed.

The hub 44w has a circular coniform flange 300 integral therewith. Opposed to the flange 300 is a complemental flange 301 disposed upon the stub shaft 26w. The flange 301 has a plurali y of radial groo s 302 within each of which is disposed a spherical centrifugal weight 303. Outward movement of said weights within the guide grooves 302 is limited by flange 304 circumscribing the flange 301. The stub shaft 26w further provides a bearing 305 for piloting the forward end of the shaft 39w. In Fig. 7, the centrifugal weights 303 are shown in their outward position, wherein they wedge themselves between flanges 300 and 301 to force the former rearwardly so that the clutch driven member 45w is in close proximity with the clutch impeller 21aw. It will be noted that the bases of flanges 300 and 301 are near enough together that the centrifugal weights 303 when in their innermost positions radially of the transmission, will still be retained within their respective grooves 302.

The sleeve 94w carries the gear 95w and a jaw clutch 306, the latter being adapted for co-engagement with the jaw clutch 113w under certain conditions of operation later to be described. The clutch 113w has a direct connection with the gear 122w instead of being connected thereto by means of an intervening camming mechanism as in the transmission shown in Fig. 1.

The gear shifter yoke 140w may be manually turned into any one of four positions indicated respectively by the dot-and-dash lines R, N, F and F'. The yoke 140w and the gear 122w are in the position corresponding to that indicated by the letter F. When in this position, the transmission mechanism is adjusted for normal forward drive. Assuming the transmission to be adjusted as illustrated in Fig. 7, when the crank shaft 15w is accelerated above engine idling speed, the friction clutch will be caused to automatically mobilize the power train of low speed ratio in the manner described with respect to the device shown in Fig. 1. The drive will then be through the sleeve 33w, sleeve 94w, gear 95w, gear 102w, clutch rollers 106w, sleeve 104w, gear 108w, gear 122w, and the driven shaft 115w upon which the gear 122w is splined.

Upon starting the vehicle by power delivered through the power train of low speed ratio, the clutch impeller 21aw will be rotated faster than the clutch driven member 45w, which has a splined connection with the shaft 39w, and consequently the fluid or other flowable substance within the clutch 21w will have a reactive effect upon the driven member 45w, whereby the latter will be forced forwardly into the pocket 22aw as permitted by said splined connection. At low speeds, the centrifugal weights 303 will offer little or no resistance to the forward movement or the clutch driven element 45w. The vehicle will, therefore, be driven through the power train of low speed ratio while only a negligible amount of the available engine torque or power is transmitted from the impeller 21aw to the driven element 45w, tending to drive the driven shaft at a higher speed ratio. Maximum acceleration is thus possible in the lower vehicular speeds.

As the speed of the vehicle engine increases, the planetary rotative speed of centrifugal weights 303 will correspondingly increase until the centrifugal force of said weights is sufficient to deflect the driven member 45w into a more efficient driving relation with the impeller 21aw. When the member 45w is in the position shown in Fig. 7, the clutch 21w will be operating at its maximum efficiency, and will establish the power train of higher ratio between the crank shaft 15w and the driven shaft 115w. The speed at which the clutch driven member 45w is moved into the most efficient driving relation with the impeller 21aw may be predetermined by selecting weights 303 of different masses.

Should it be desired to drive the vehicle at the higher speed ratio and independently of the fluid clutch 21w, the yoke 140w may be shifted to position F' whereby to disconnect gear 122w from the gear 108w and clutch 113w from clutch 112w, and to connect the clutch 113w with clutch 306. By thus disconnecting the gears 122w and 108w the power train of lower speed ratio is completely demobilized; and when clutches 113w and 112w are disconnected, the shaft 39w may run free of the load. Clutch members 113w and 306, together with the automatically engaged friction clutch contained within the carrier 19w establish a one to one driving ratio between the crank shaft 15w and the driven shaft 115w.

When it is desired to arrange the transmission in the neutral position, yoke 140w is shifted to position N, wherein the gear 122w lies between gears 108w and 109w, and wherein jaw clutch 113w is disconnected from jaw clutch 112w. Reverse drive is effected by shifting the yoke 140w to position R, whereby the gear 122w is carried into mesh with an idler gear, not shown, driven by the gear 109w.

In that form of the transmission mechanism shown in Fig. 9, those parts corresponding to parts shown in Fig. 1 are designated by the same reference characters with the additional letter "x". Those parts corresponding to parts shown in Figs. 7 and 8, but not shown in Fig. 1, will be designated by the same reference characters and will likewise be further designated by the letter "x." The gear box 11x contains mechanism similar to that shown in Fig. 1.

The hub 44x is splined upon a forward section 50x of the longitudinally shiftable shaft 39x, and is urged rearwardly at all times by a spring 200x. The shaft 39x has a shoulder 201x, which abuts against the hub 44x, whereby the latter may be shifted forwardly against the urge of the spring 200x incident to a forward shift of the shaft 39x as has been explained hereinabove in the description of the operation of that form of the invention shown in Fig. 1.

At relatively high rotating speeds, the centrifugal weights 303x wedge themselves between flanges 300x and 301x, whereby to augment the effect of the spring 200x. The centrifugal weights 303x provide an auxiliary means to preclude shifting of the transmission device from the higher speed ratio to the lower speed ratio while operating at high speeds, irrespective of the torque transmitted through the clutch 21x. Moreover, the centrifugal weights 303x increase the tendency of the transmission to shift over from the power train of lower speed ratio to the power train of higher speed ratio when accelerating at relatively high speeds and without the operator momentarily closing the engine throttle.

I claim:

1. Automatic change-speed power transmission mechanism comprising in combination with driving and driven shafts, a power train of selected speed ratio including an overrunning clutch and complemental cam mechanism displaceable in accordance with the amount of power transmitted through said train, a power train of higher speed ratio adapted to drive the driven shaft from the driving shaft, said overrunning clutch permitting of said train of higher ratio driving the driven shaft independently of said train of selected ratio, said higher ratio train including a flowable-substance medium clutch having driving and driven elements of which the driven element impositively follows the movement of the driving element for coupling said train of higher ratio between said shafts, and an axially shiftable power shaft driven from said driven element, said driven element being shiftable with said power shaft between positions of respectively greater and less tendency of said driven element to follow the driving element, said power shaft having an operative connection with said cam mechanism so that shifting of said power shaft and said driven clutch element is in accordance with the displacement of said cam mechanism.

2. Automatic change-speed power transmission mechanism comprising in combination with driving and driven shafts, a power train of selected speed ratio including an overrunning clutch and complemental cam mechanism displaceable in accordance with the amount of power transmitted through said train, a power train of higher speed ratio adapted to drive the driven shaft from the driving shaft, said overrunning clutch permitting of said train of higher ratio driving the driven shaft independently of said train of selected ratio, said higher ratio train including a flowable-substance medium clutch having driving and driven elements of which the driven element impositively follows the movement of the driving element for coupling said train of higher ratio between said shafts, an axially shiftable power shaft driven from said driven element, said driven element being shiftable with said power shaft between positions of respectively greater and less tendency of said driven element to follow the driving element, and means for urging said driven element toward a position wherein the tendency thereof to follow the driving element is increased, said power shaft having an operative connection with said cam mechanism so that shifting of said power shaft and said driven clutch element is in accordance with the displacement of said cam mechanism and in opposition to said urging means.

3. Automatic change-speed power transmission mechanism comprising in combination with driving and driven shafts, a power train of selected speed ratio including an overrunning clutch and complemental cam mechanism displaceable in accordance with the amount of power transmitted through said train, a power train of higher speed ratio adapted to drive the driven shaft from the driving shaft, said overrunning clutch permitting of said train of higher ratio driving the driven shaft independently of said train of selected ratio, said higher ratio train including a flowable-substance medium clutch having driving and driven elements of which the driven element impositively follows the movement of the driving element for coupling said train of higher ratio between said shafts, an axially shiftable power shaft driven from said driven element, said driven element being shiftable with said power shaft between positions of respectively greater and less tendency of said driven element to follow the driving element, and spring means for urging said driven element toward a position wherein the tendency thereof to follow the driving element is increased, said power shaft having an operative connection with said cam mechanism so that shifting of said power shaft and said driven clutch element is in accordance with the displacement of said cam mechanism, and in opposition to said urging means.

4. Automatic change-speed power transmission mechanism comprising in combination with driving and driven shafts, a power train of selected speed ratio connecting said shafts and including an overrunning clutch, a power train of higher speed ratio likewise connecting said shafts and adapted to drive the driven shaft from the driving shaft, said overrunning clutch permitting of said train of higher ratio driving the driven shaft independently of said train of selected ratio, said higher ratio train including a flowable substance medium clutch having driving and driven elements of which the driven element impositively follows the movement of the driving element in accordance with the spacing between said elements, said driven element being splined to the driven shaft and adapted to be moved axially thereon, and a camming mechanism for effecting the axial movement of said driven member with respect to said shaft to control the degree with which the driven member tends to follow the driving member, said camming mechanism comprising a conical surface on the driving member, a complemental conical surface on the driven member and radially movable masses cooperating with said conical surfaces to separate said surfaces in accordance with the radial position of said masses, said driven member reacting with the fluid substance to generate a force component tending to move the driven member into a position wherein the tendency to follow the driving member is a minimum, and said masses tending under centrifugal action to move the driven member into a position wherein the tendency to follow the driving member is a maximum.

5. Automatic change-speed power transmission mechanism as described in claim 4, and resilient means between the driving and driven elements aiding the reactive force of the fluid substance to move the driven element into a position wherein the tendency to follow the driving members is a minimum.

6. Automatic change-speed power transmission mechanism as described in claim 1, and speed responsive means between the driving and driven elements for precluding the movement of the driven element to a position wherein its tendency to follow the driving element is a minimum to preclude a change from the high ratio train to the low ratio train under high speed and torque conditions.

7. Automatic change-speed power transmission mechanism as described in claim 1, and means for precluding the movement of the driven element to a position wherein its tendency to follow the driving element is a minimum, said means comprising a conical flange on the driving element, a complemental conical flange on the driven element, radial grooves in one of said flanges, and masses in said grooves, said masses acting under centrifugal force to separate said conical flanges and thereby increase the tendency of the driven element to follow the driving element against the action of the torque responsive camming members.

8. Automatic change-speed power transmission mechanism as described in claim 1, and means for precluding the movement of the driven element to a position wherein its tendency to follow the driving element is a minimum, said means comprising a conical flange on the driving element, a complemental flange on the driven element, radial grooves in one of said flanges, and balls in said grooves, said balls having such mass as to develop an axial component when acting under centrifugal force as to tend to separate said conical flanges and thereby to increase the tendency of the driven element to follow the driving element against the action of the torque responsive camming members.

9. Automatic change-speed power transmission mechanism comprising in combination with driving and driven shafts, a power train of selected speed ratio between said shafts and including an overrunning clutch, a power train of higher speed ratio between said shafts and being adapted to drive the driven shaft from the drive shaft incident to overrunning said clutch, a flowable substance clutch mechanism in series with the train of higher ratio, said clutch mechanism including driving and driven elements of which the driven element tends to follow the movement of the driving element for coupling said train of higher ratio between said shafts, a conical flange on the driving member, a complemental conical flange on the driven member and masses included between said conical surfaces and tending under centrifugal action to separate said flanges and to increase the tendency of the driven member to follow the driving member, said conical flanges and masses constituting a means for preventing a change from high speed ratio to low speed ratio when the driving member is rotating at high speed.

BENJAMIN A. SWENNES.